US00RE47616E

(19) United States
(12) Reissued Patent
Murphy

(10) Patent Number: US RE47,616 E
(45) Date of Reissued Patent: Sep. 24, 2019

(54) HAND TRUCK

(71) Applicant: TM-Logic LLC, Sterling, VA (US)

(72) Inventor: Jerry Murphy, Mesa, AZ (US)

(73) Assignee: TM-Logic LLC, Sterling, VA (US)

(21) Appl. No.: 15/621,468

(22) Filed: Jun. 13, 2017

Related U.S. Patent Documents

Reissue of:
(64) Patent No.: 9,233,699
Issued: Jan. 12, 2016
Appl. No.: 13/506,745
Filed: May 14, 2012

(51) Int. Cl.
*B62B 1/04* (2006.01)
*B62B 1/12* (2006.01)
*B62B 1/14* (2006.01)
*B62B 1/26* (2006.01)

(52) U.S. Cl.
CPC ..... *B62B 1/04* (2013.01); *B62B 1/12* (2013.01); *B62B 1/14* (2013.01); *B62B 1/264* (2013.01); *B62B 2202/02* (2013.01); *B62B 2203/10* (2013.01)

(58) Field of Classification Search
CPC .... B62B 1/12; B62B 1/14; B62B 1/04; B62B 1/264; B62B 2202/02
See application file for complete search history.

(56) References Cited

U.S. PATENT DOCUMENTS 507,483 A * 10/1893 Cadarelli ..... B62B 3/108 193/41
1,986,620 A 1/1935 Borden et al.
2,598,489 A 5/1952 Bayer et al. ..... B62B 1/14 187/244
2,688,881 A * 9/1954 Crossland ..... 74/412 R
2,895,567 A * 7/1959 Hall ..... 187/224
2,904,201 A 9/1959 Rhodes
3,052,323 A 9/1962 Hopfeld
3,156,315 A 11/1964 Hawgood
3,907,138 A 9/1975 Rhodes
(Continued)

FOREIGN PATENT DOCUMENTS

JP 2005-75248 3/2005
JP 2005075248 * 3/2005 ..... B62B 3/06

OTHER PUBLICATIONS

EnglishTranslation of JP 2005-75248 obtained from Lexis-Nexis Total Patent on Mar. 19, 2019.

*Primary Examiner* — Jeffrey R Jastrzab
(74) *Attorney, Agent, or Firm* — Woodard, Emhardt, Henry, Reeves & Wagner, LLP

(57) ABSTRACT

A hand truck having a frame two short and two long sides; a wheel and axel assembly attached to the frame; a lifting assembly extending between the two short sides; said lifting assembly comprising a frame center pole rail having an attached gear rack, a gear box movably attached to the center pole, said gear box including, a toothed that meshes with the gear rack, a worm gear having a drive shaft that meshes with the toothed pinion, wherein rotation of the drive shaft causes the worm gear to drive the pinion along the gear rack; a lift bracket attached to the gear box comprising a receiving plate with at least one slot; and at least one removable lift platform comprising a platform plate with at least one key that is securely receivable into the slot; wherein the gearbox is drivable using a power supply supplied by a user.

17 Claims, 14 Drawing Sheets

(56) References Cited

U.S. PATENT DOCUMENTS 3,921,958 A 11/1975 Brockelsby et al. .... B60D 1/66 254/420
4,049,083 A 9/1977 Garvey
4,722,658 A * 2/1988 Wurtz ..... B65F 3/045 414/404
4,728,245 A 3/1988 Shelton
4,756,540 A * 7/1988 Crawford ..... B62B 1/145 280/47.21
5,017,080 A * 5/1991 Thorndike ..... B62B 1/14 294/104
5,029,884 A 7/1991 Maendel
5,207,550 A * 5/1993 Lehman ..... B66F 9/125 414/420
5,228,716 A 7/1993 Dahl
5,252,022 A * 10/1993 Culp ..... E02F 3/3622 172/273
5,344,278 A * 9/1994 Emig, Jr. ..... B62B 3/04 294/119.2
5,372,470 A 12/1994 Wilke et al.
5,379,814 A * 1/1995 Posly ..... B66F 9/06 141/351
6,302,377 B1 * 10/2001 Pimentel ..... B66F 3/02 254/30
6,398,477 B1 6/2002 Fox
6,406,248 B1 6/2002 McGill et al.
6,530,740 B2 3/2003 Kim
6,561,745 B2 5/2003 Rountree
6,929,443 B1 8/2005 Nellis
6,971,654 B2 12/2005 Amsili
7,137,464 B2 11/2006 Stahler, Sr.
7,712,582 B2 5/2010 Burton et al.
7,841,603 B2 11/2010 White
7,914,017 B2 3/2011 Setzer, Sr. et al.
8,465,046 B2 6/2013 Meyers et al.
8,851,215 B2 10/2014 Goto
9,120,657 B1 9/2015 Turner
9,150,233 B2 10/2015 Su
9,282,695 B2 3/2016 Goto
9,321,471 B1 4/2016 Gedeon-Janvier
9,969,411 B2 5/2018 Belotti et al.
2001/0038786 A1 11/2001 Kim
2002/0134970 A1 * 9/2002 Bressner ..... B66F 9/06 254/4 R
2003/0049116 A1 * 3/2003 Henning ..... B66F 9/22 414/667
2004/0076501 A1 4/2004 McGill et al.
2005/0110232 A1 5/2005 DiBenedetto
2005/0169736 A1 * 8/2005 Decky ..... 414/490
2007/0152413 A1 * 7/2007 White ..... 280/47.29
2008/0054581 A1 3/2008 Voth
2009/0285659 A1 * 11/2009 Wilson ..... B62B 3/04 414/444
2011/0130865 A1 * 6/2011 Setzer, Sr. ..... B66F 9/08 700/213
2011/0243696 A1 * 10/2011 DiBenedetto ..... 414/490
2012/0055122 A1 * 3/2012 Beauchamp ..... 53/492
2012/0207571 A1 * 8/2012 Scott ..... B62B 1/16 414/419
2012/0242063 A1 9/2012 Bruckner
2012/0286483 A1 * 11/2012 Fluet-Howrish ..... B62B 5/023 280/5.3
2013/0121795 A1 * 5/2013 Le ..... B62B 1/12 414/490
2013/0181418 A1 * 7/2013 Burton et al. ..... 280/47.19
2013/0270785 A1 * 10/2013 Whinnery ..... B62B 1/12 280/47.29
2013/0302120 A1 11/2013 Murphy
2016/0236699 A1 8/2016 Wang

* cited by examiner

HAND TRUCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 9,233,699 issued on Jan. 12, 2016.*

FIELD OF THE INVENTION

The present invention relates to a hand truck. More specifically, the hand truck of the present invention includes a powered lifting/lowering feature.

BACKGROUND

Hand trucks are well known devices used for the manual transportation of heavy loads from one location to another location. The most common hand truck has a generally L-shaped body with wheels at the vertex of the L-shaped body and at least one handle located either around a mid-point of the L-shape or near the top of the L-shape. The short leg of the L-shape is the load bearing portion of the hand truck, with the short let typically level with a support surface when the hand truck is upright. An object to be moved is tilted forward, the short leg is inserted underneath such object, the object is then allowed to tilt back and rest on the short leg. Then the hand truck, with supported object, is tilted backward until the center of gravity of the combination is generally balanced over the wheels, making otherwise bulky and heavy objects easier to move.

Improvements to such hand-propelled vehicles have been developed over the years. One improvement relates to providing powered lifting, lowering and transporting features. One example of such a prior art device is disclosed in U.S. Pat. No. 6,530,740 issued to Kim on Mar. 11, 2003. Kim teaches a hand truck with an electrically operated lifting platform. While Kim is an improvement over the prior art hand-propelled vehicles, the Kim hand truck does not fully address several problems related to providing a powered hand truck device with powered features; some of which are discussed below. In addition, Kim provides no teachings related to associating an electronic module for providing automatic features to such the system (as described later).

Thus there is a current need for new handtrucks.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide a portable apparatus for manually transporting items with a powered lifting and lowering feature.

Another object of the invention is to provide a portable apparatus for manually transporting items comprising a powered lifting and lowering feature, wherein said apparatus comprises a removably attachable motor, such as a hand drill or the like.

It is yet another object of the present invention is to provide a hand truck for moving heavy or bulky objects comprising: a frame having two short sides and two long sides; a wheel and axel assembly attached to the frame; a lifting assembly located an intermediate position between the two long sides and extending between the two short sides; said lifting assembly comprising: a frame center pole rail having a gear rack attached thereto, a gear box movably attached to the center pole, said gear box including, a toothed pinion, located in the movable gear box, mounted on a shaft in the gear box and meshing with the gear rack of the center pole, a worm gear that meshes with the toothed pinion, said worm gear including a drive shaft, wherein rotation of the drive shaft causes the worm gear to drive the pinion along the gear rack; a lift bracket comprising a receiving plate with at least one slot; and at least one removable lift platform comprising a platform plate with at least one key that are securely receivable into the slot of the lift bracket receiving plate.

It is yet another object of the present invention to provide the above hand truck wherein the gearbox is drivable using a power supply supplied by a user.

It is yet another object of the present invention to provide the above hand truck further comprising an aperture located in the platform plate and a locking mechanism located on the lift bracket receiving plate and receivable by the aperture located in the platform plate.

It is yet another object of the present invention to provide the above hand truck wherein at least one of the at least one removable lift platform includes a lift platform attached to a bottom edge of the platform plate.

It is yet another object of the present invention to provide the above hand truck wherein at least one of the at least one removable lift platform includes a pair of lift bumpers attached at a top end and a bottom end of the platform plate.

It is yet another object of the present invention to provide the above hand truck wherein at least one of the at least one removable lift platform includes a pair of lift cradles attached at a top end and a bottom end of the platform plate.

It is yet another object of the present invention to provide the above hand truck wherein at least one of the at least one removable lift platform includes a lift platform attached to a bottom edge of the platform plate, at least one of the at least one removable lift platform includes a pair of lift cradles attached at a top end and a bottom end of the platform plate, and at least one of the at least one removable lift platform includes a pair of lift cradles attached at a top end and a bottom end of the platform plate.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C.

§112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
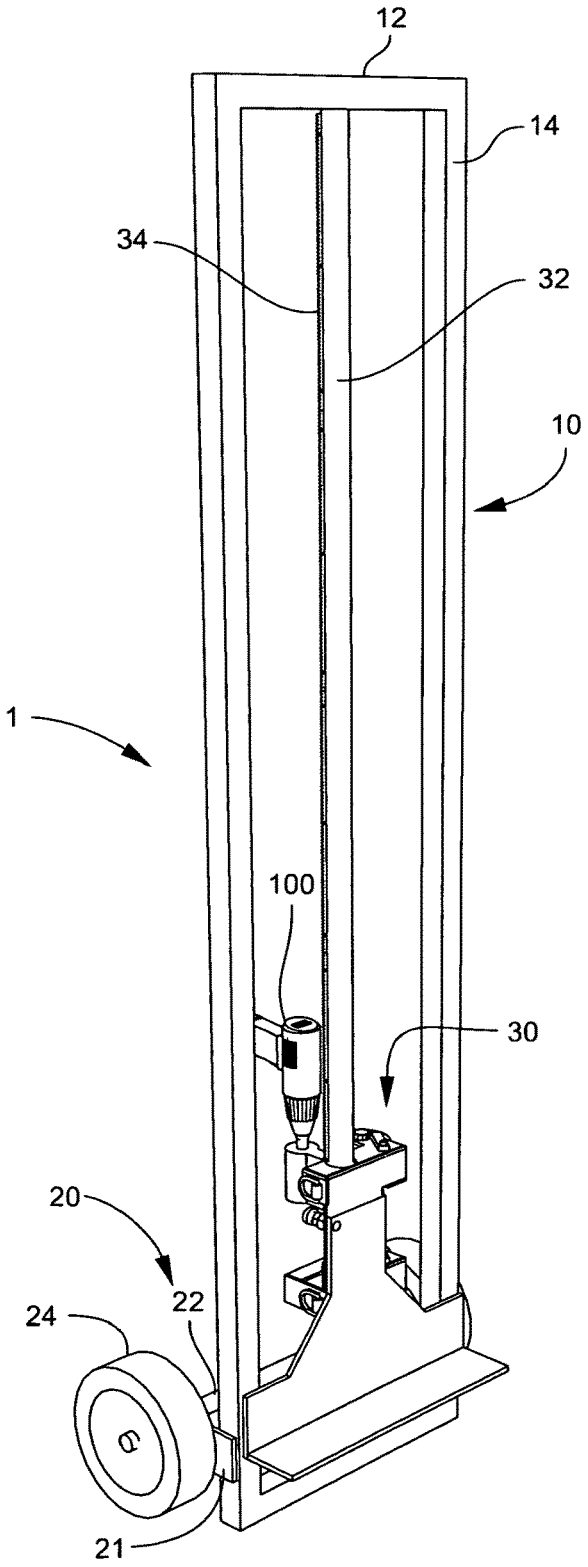
FIG. 1 illustrates one embodiment of the present invention.
Figure 2:
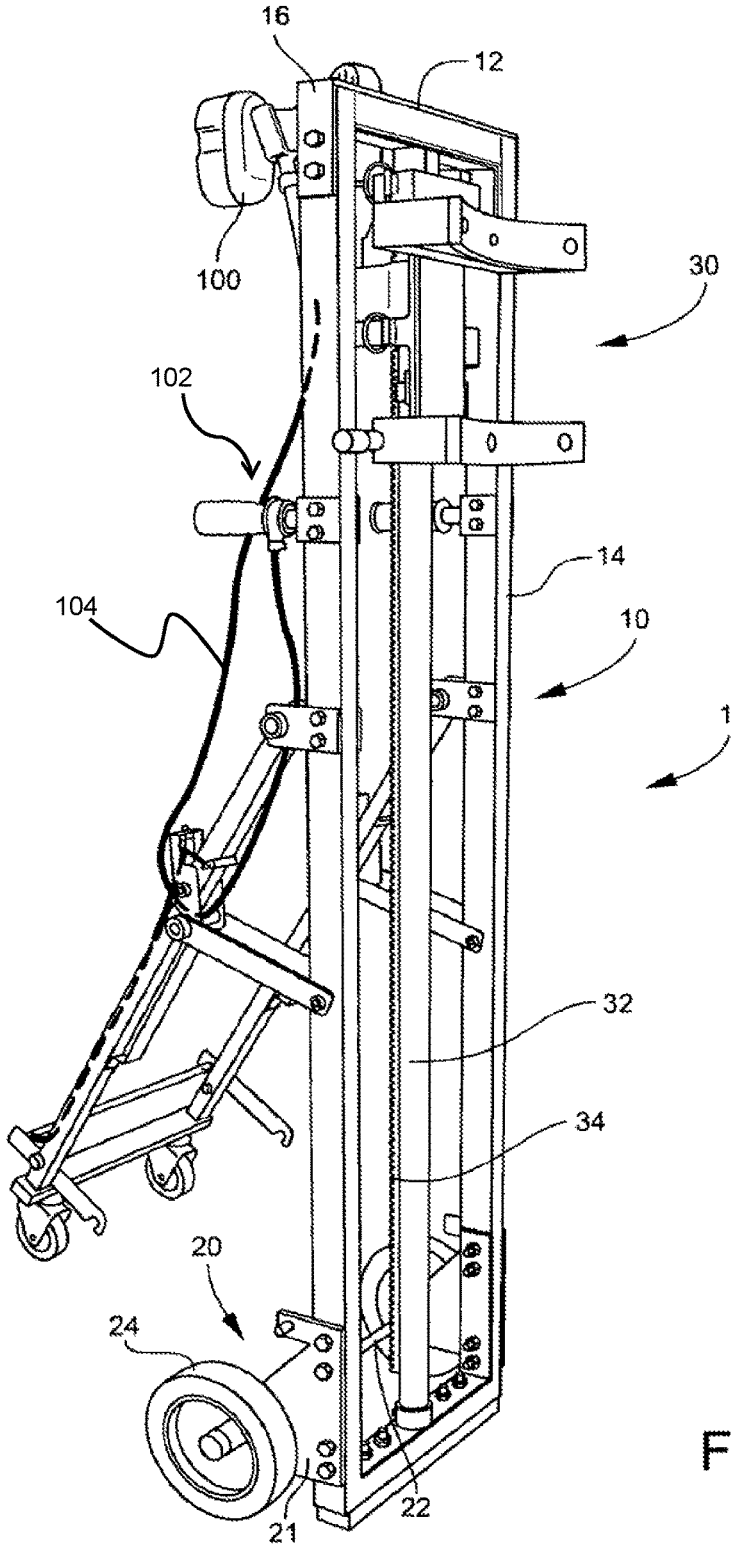
FIG. 2 illustrates a second embodiment of the present invention.
Figure 3:
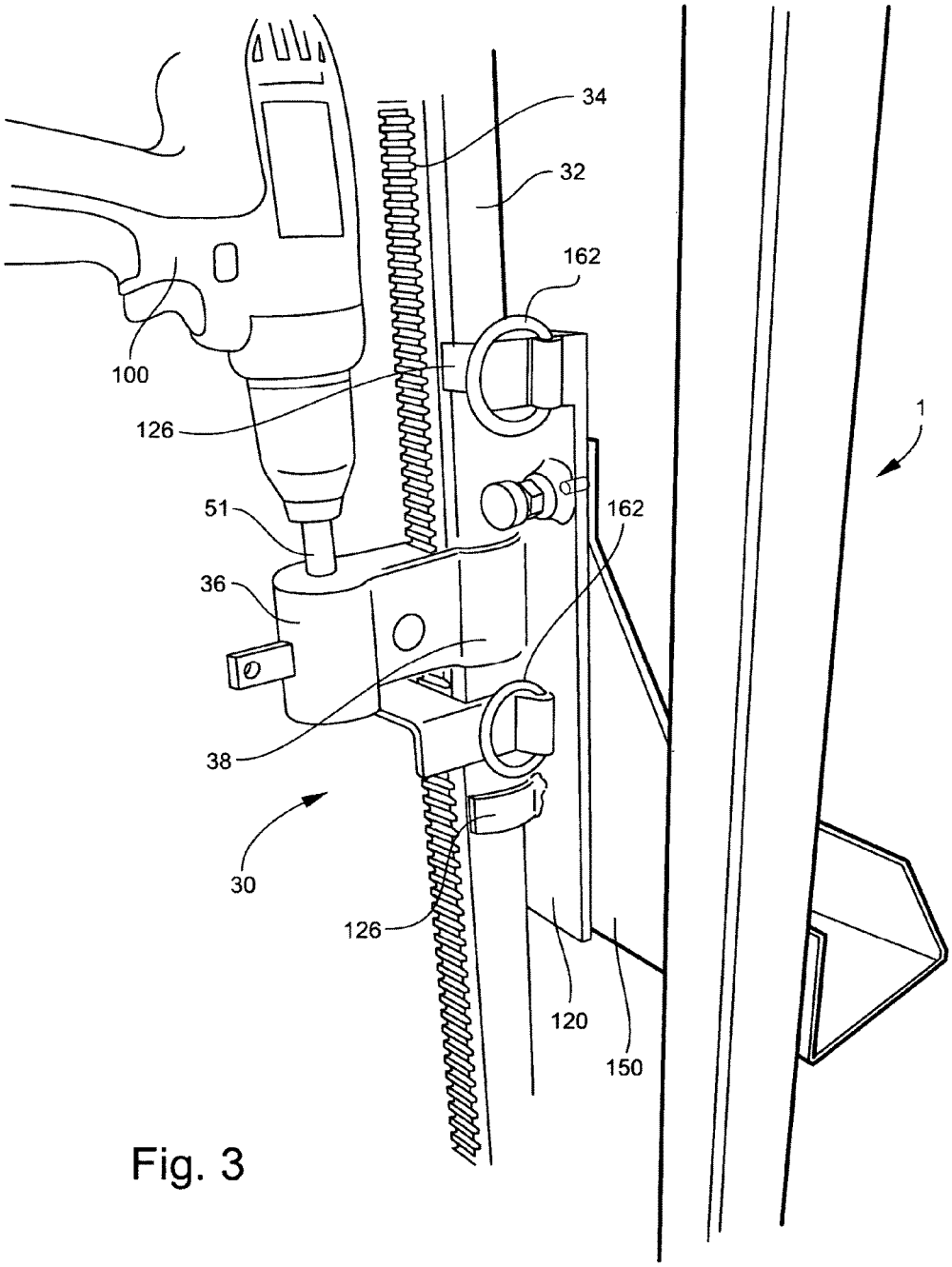
FIG. 3 illustrates the drive mechanism of the present invention.
Figure 4:
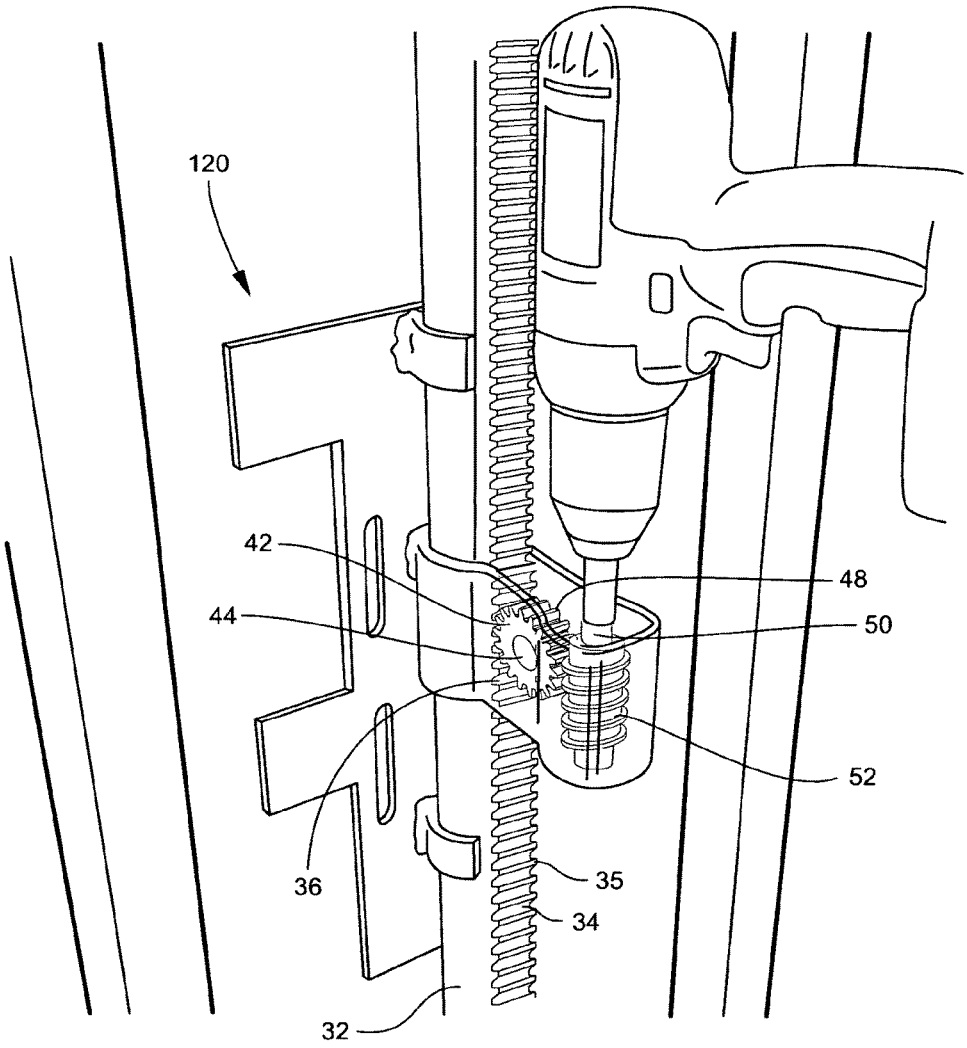
FIG. 4 illustrates the inner elements of the drive mechanism of the present invention.
Figure 5:
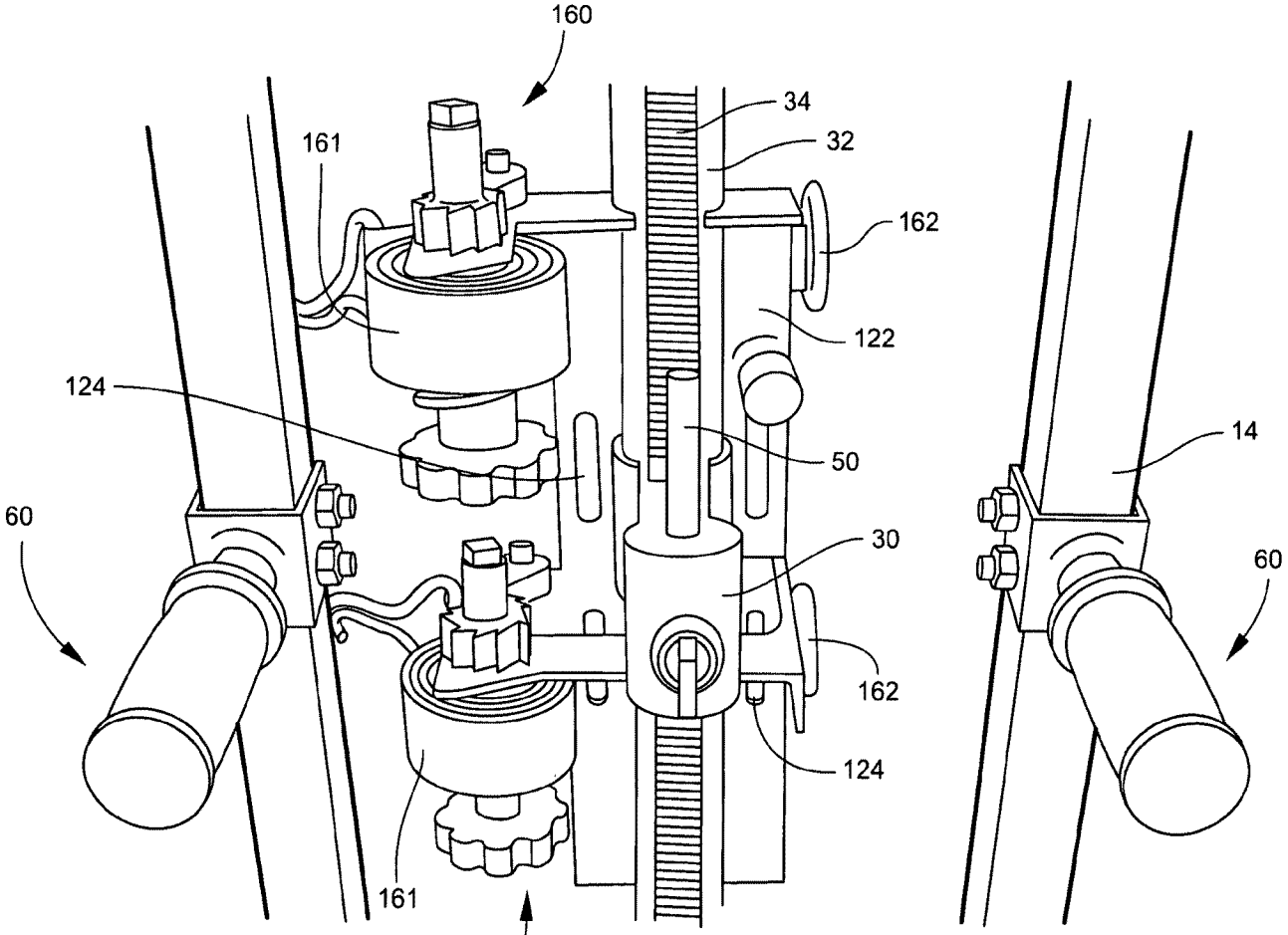
FIG. 5 illustrates the strap, drive, and handle mechanisms of the present invention.
Figure 6:
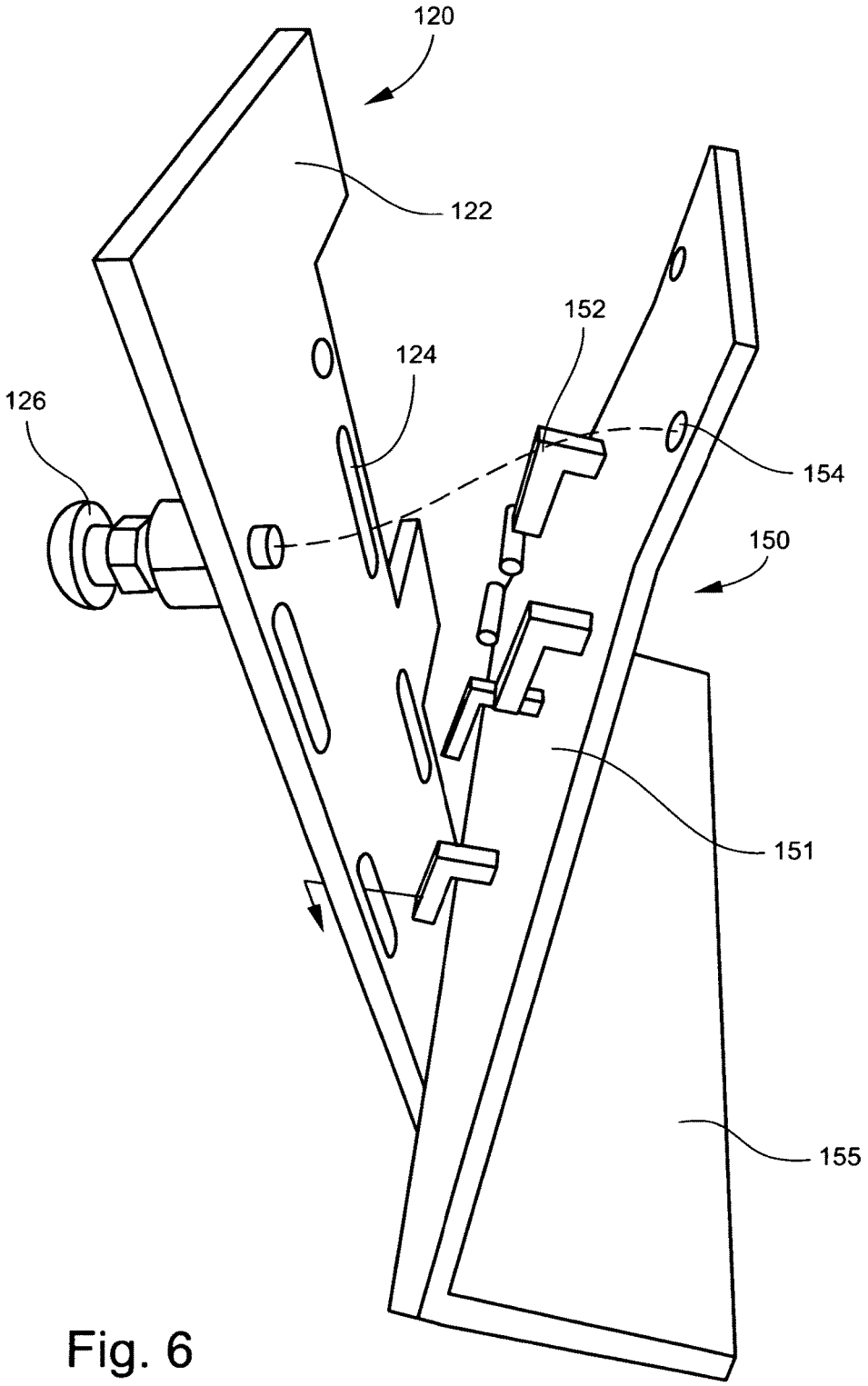
FIG. 6 illustrates the attachment of a first embodiment of the lifting platform for the present invention.
Figure 7:
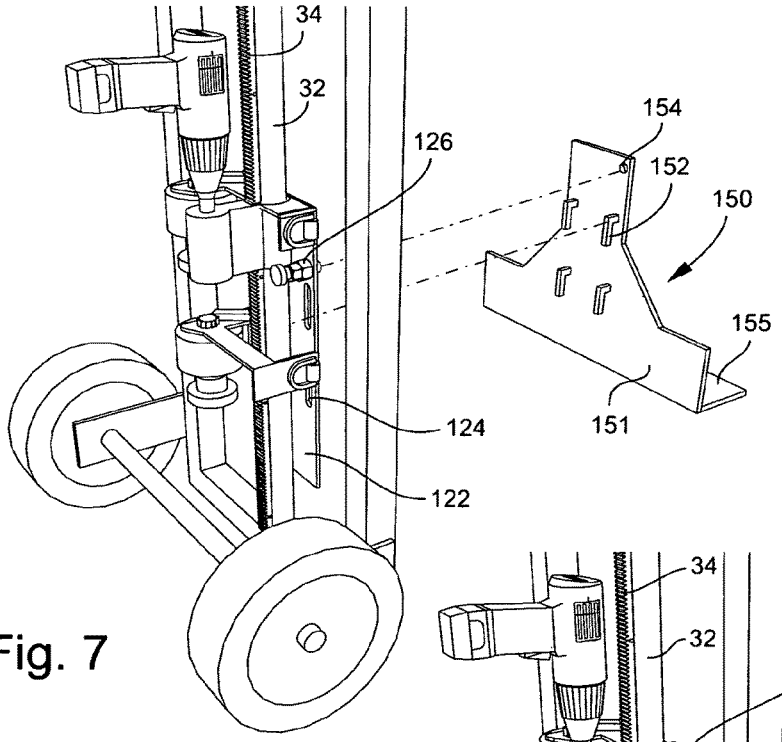
FIG. 7 is an exploded view showing the lifting platform separated from the hand truck of the present invention.
Figure 8:
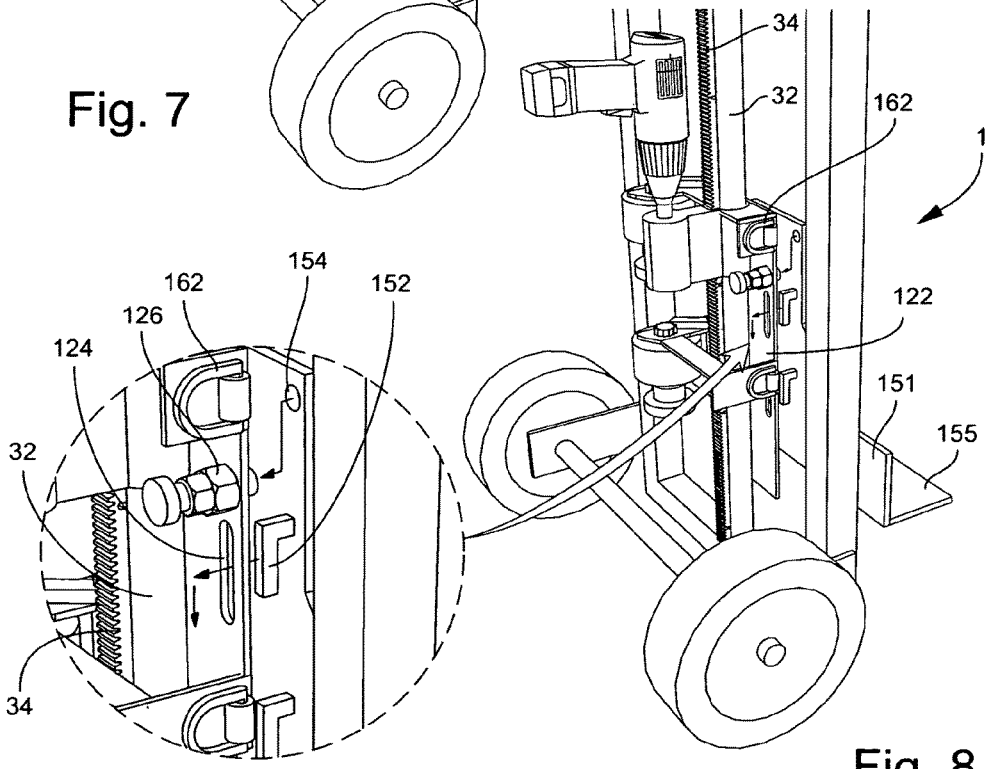
FIG. 8 shows the attachment of the lifting platform to the hand truck of the present invention, the magnification illustrates how various portions of the lifting platform line up with complementary portions lift bracket of the hand truck.
Figure 9:
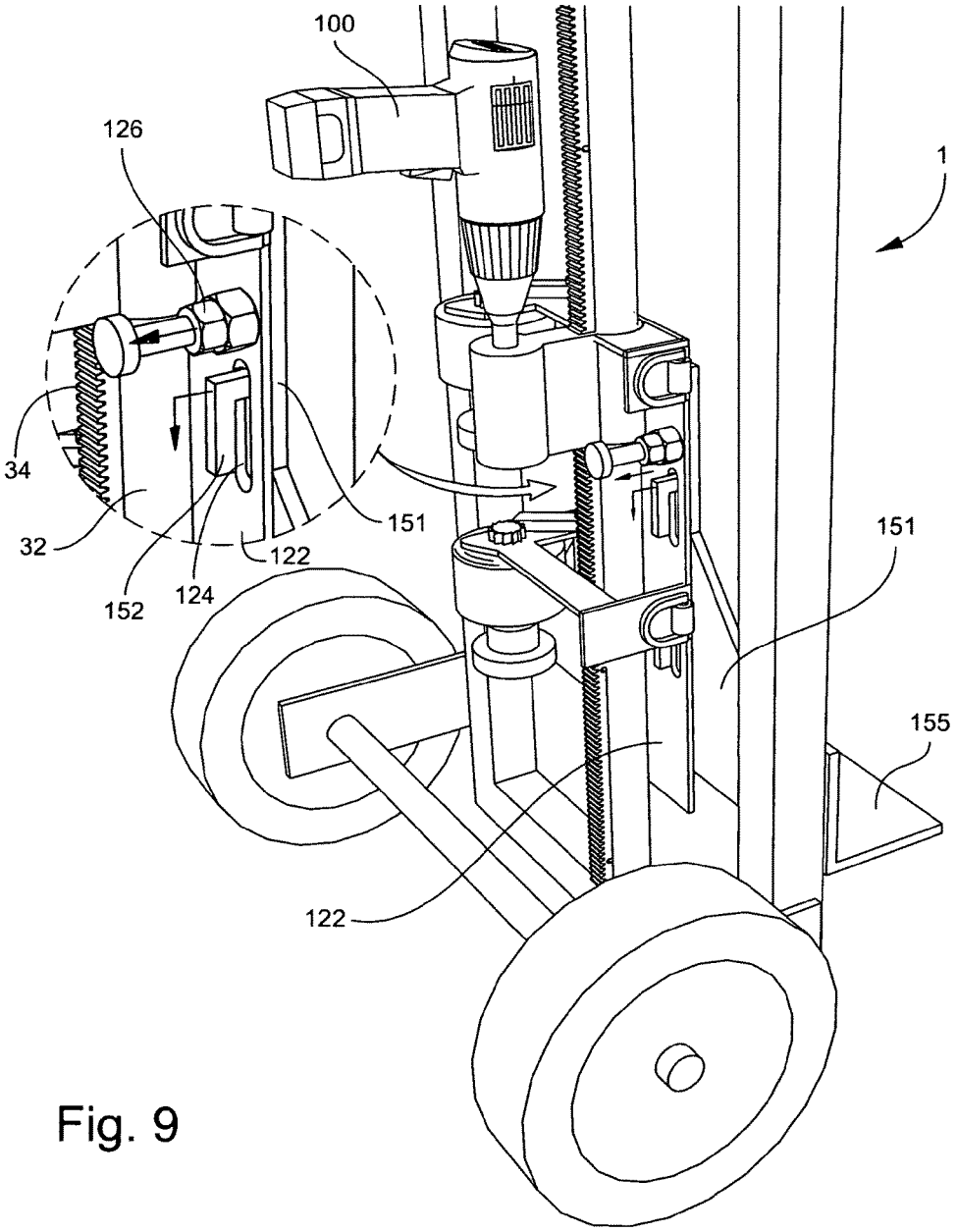
FIG. 9 illustrates the direction of movement of the keys and pop pin of the lift mechanism.
Figure 10:
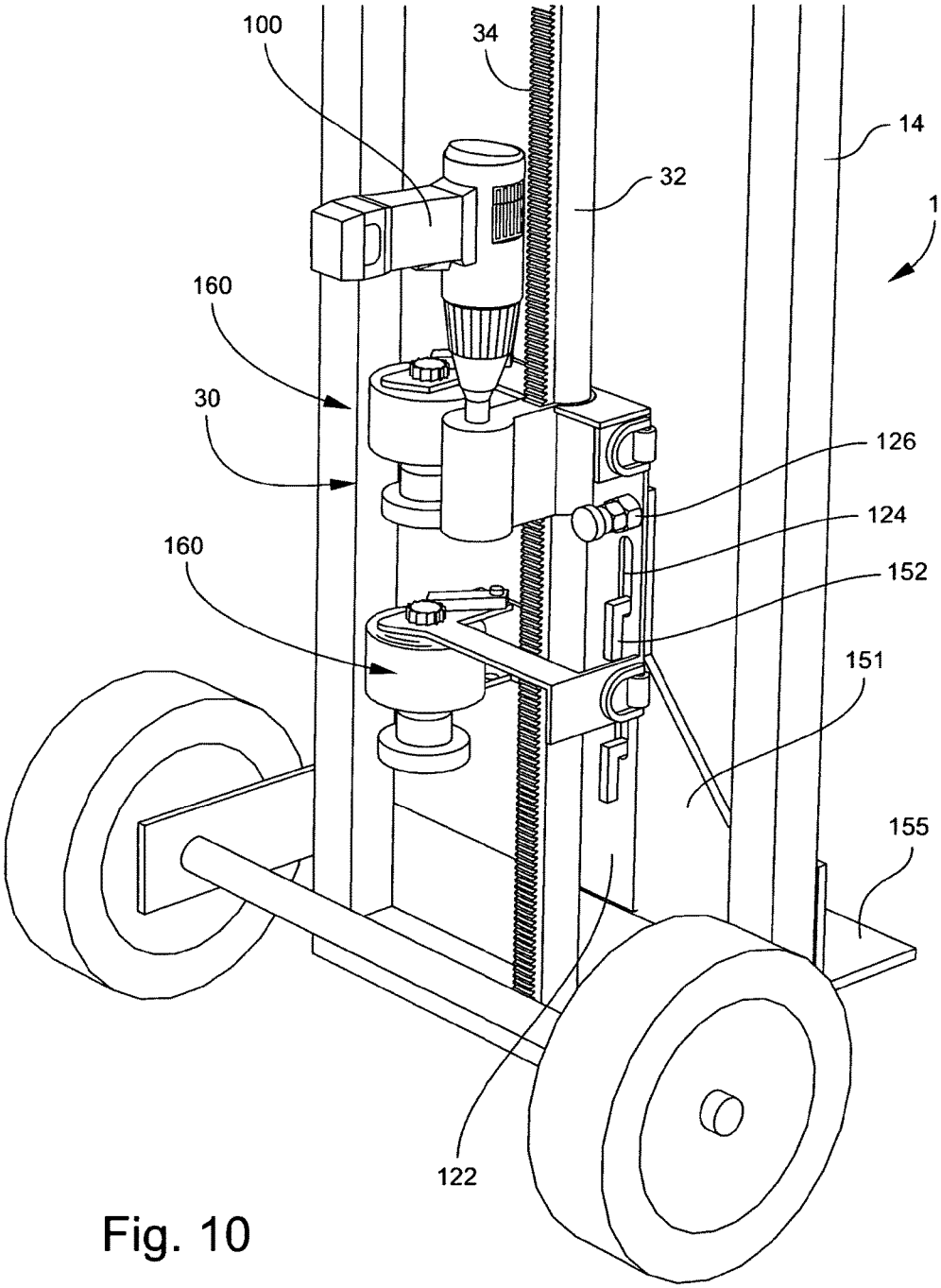
FIG. 10 illustrates a perspective view of the bottom half of a hand truck according to the present invention with a lifting platform attached to the hand truck.
Figure 11:
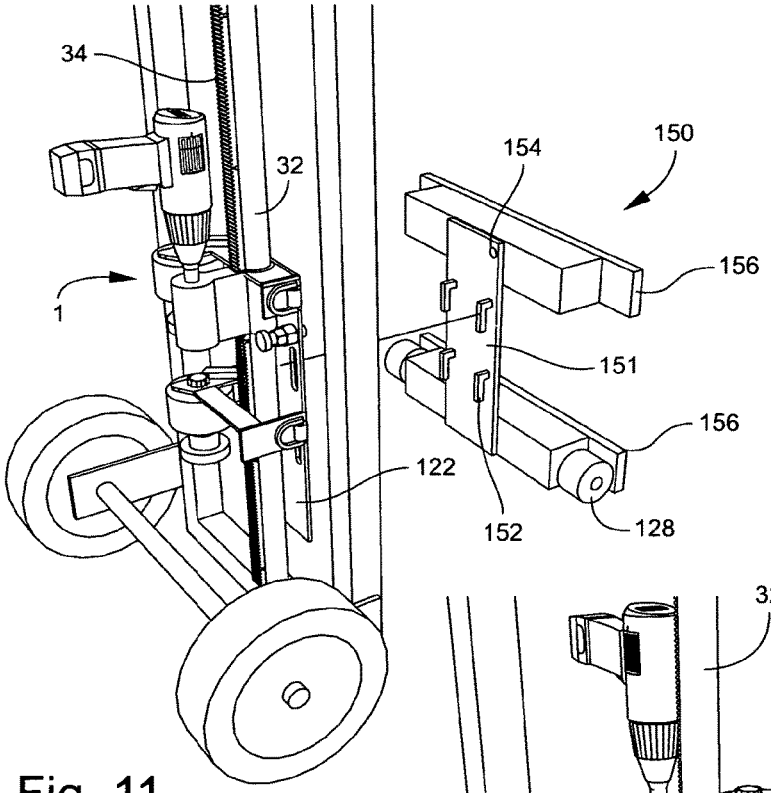
FIG. 11 is an exploded view showing a second embodiment of the lifting platform separated from the hand truck of the present invention.
Figure 12:
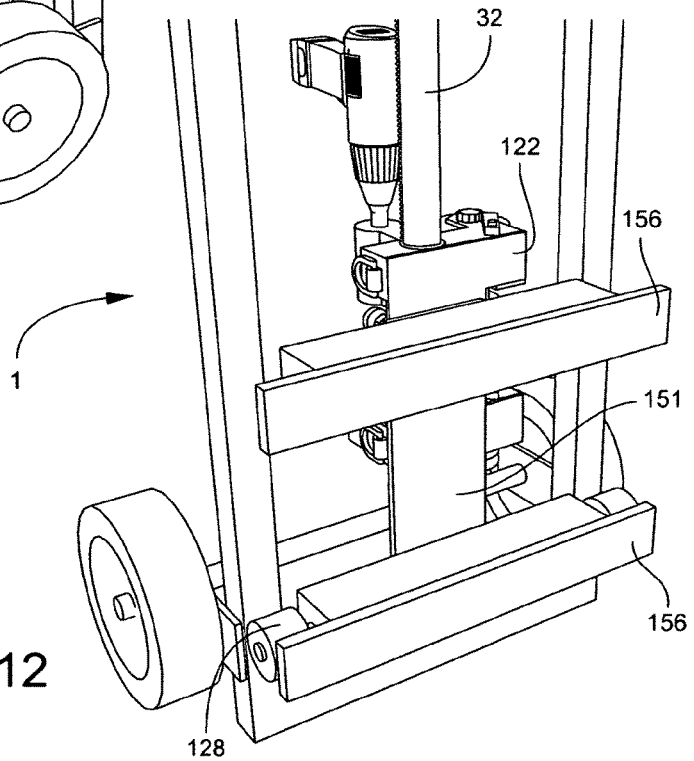
FIG. 12 is a front perspective view of the second embodiment of the lifting platform attached to the hand truck according to the present invention.
Figure 13:
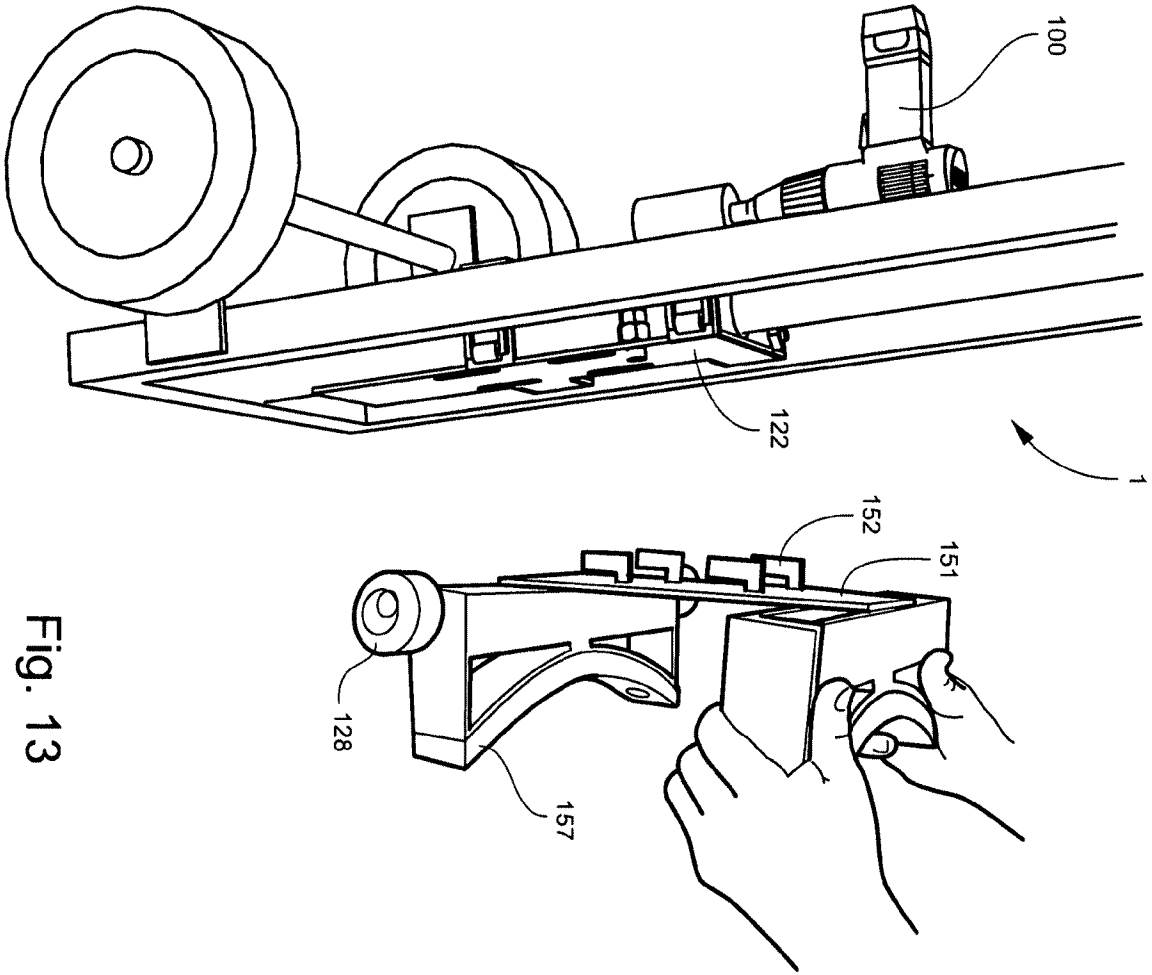
FIG. 13 is a first illustration of the placement of a third embodiment of a lifting platform onto a hand truck according to the present invention.
Figure 14:
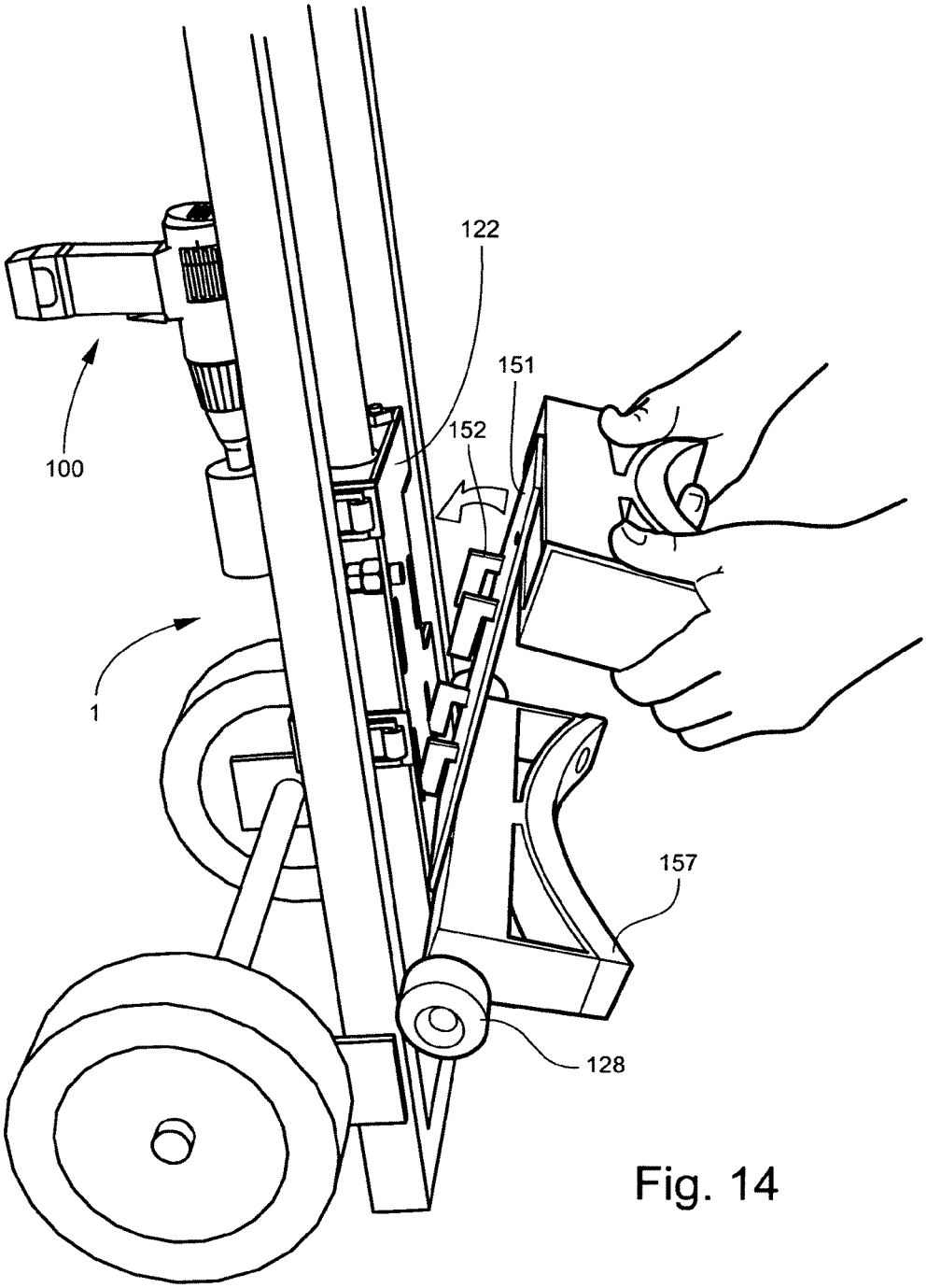
FIG. 14 is a second illustration of the placement of a third embodiment of a lifting platform onto a hand truck according to the present invention.
Figure 15:
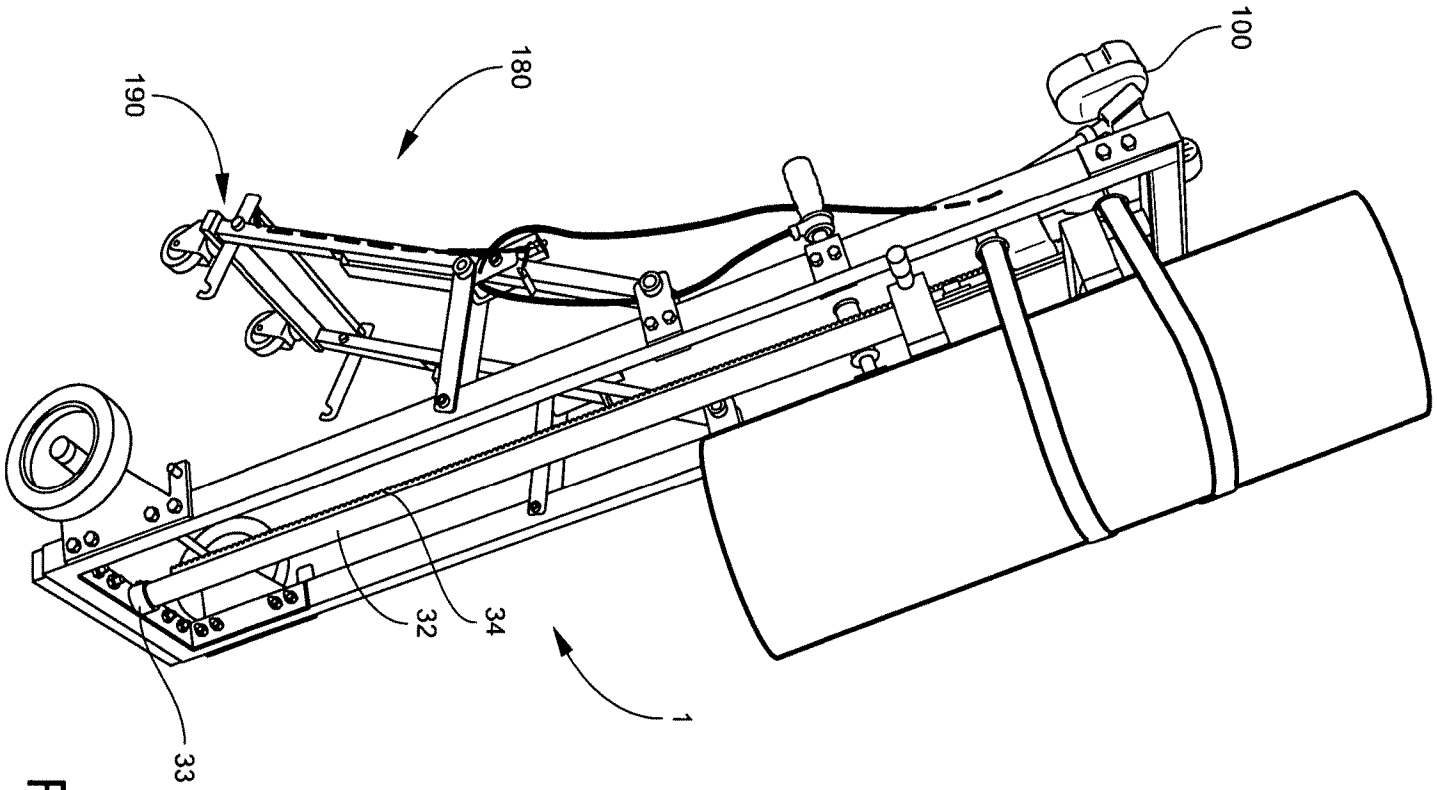
FIG. 15 illustrates the use of the third lifting platform embodiment in lifting a cylindrical object, such as a water heater.
Figure 16:
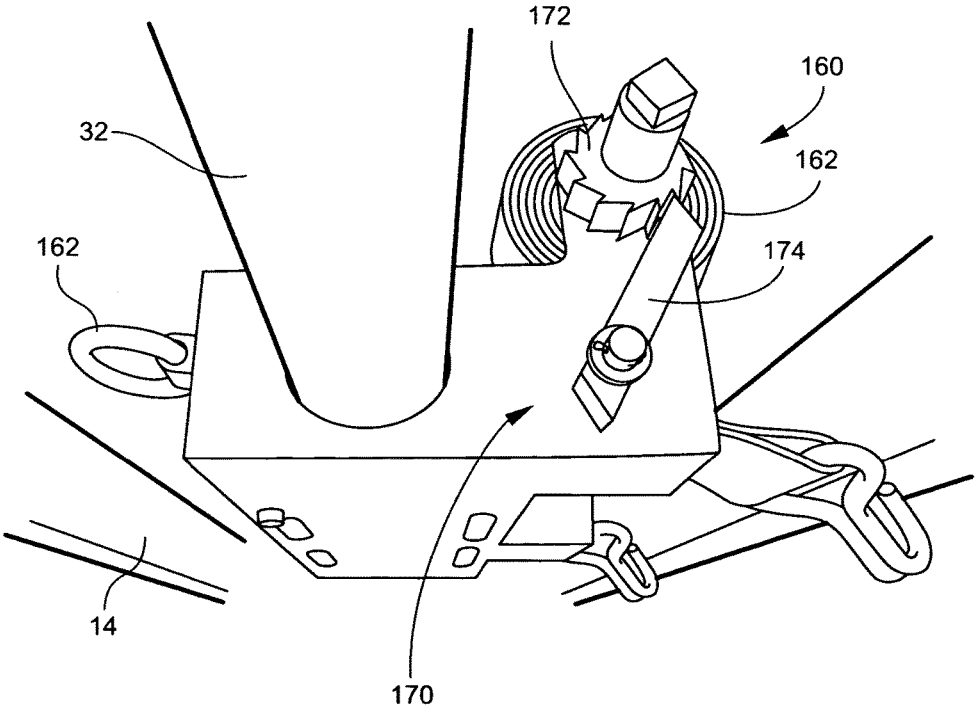
FIG. 16 illustrates a strap locking mechanism for the hand truck according to the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect, wireless, or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

While this section of the specification may contain headers, such headers are simply place markers and do not form a part of the specification and are not to be used in the construction of the specification.

While the particulars of the present invention and associated technology may be adapted for use with any type of apparatus for manually transporting items, the examples discussed herein are primarily in the context of a hand truck/dolly structure.

Referring now to the figures, the present invention is a hand truck 1. The hand truck 1 comprises a generally rectangular frame 10 having two short sides 12 and two long side 14. Preferably, the frame 10 is basically constructed from aluminum, however it could be made out of steel, plastic, or the like. In a most preferred embodiment, the generally rectangular frame 10 has square corners with upper and lower frame corner brackets 16 made out of steel to provide additional frame strength.

Located adjacent one of the short sides 12 is a wheel and axel assembly 20 comprising at least two wheel brackets 21 attached to the frame 10, a wheel axel rod 22 rotationally attached to, and extending between, the at least two wheel brackets 21, and at least two wheels 24 attached to opposite ends of the wheel axel rod 22, respectively. Solid or inflated wheels may be used in with the present invention. The preferred wheels are those typical used on hand trucks, dollies, carts and the like.

Located at an intermediate position between the two long sides 14, and extending between the two short sides 12, is a lifting assembly 30.

The lifting assembly 30 preferably comprises a frame center pole rail 32 that has an attached gear rack 34. The frame center pole 32 is preferably a 1" to 1½" galvanized steel pole. The frame center pole 32 is received into an upper and lower receiving 1¾" tube brackets 33, which are mounted to the short legs 12 of the frame 10 in order to securely attach the frame center pole 32 to the frame 10. Preferably, the frame center pole 32 has the metal gear rack 34 welded to a back face of the frame center pole 32, however, alternate attachment means that are common in the arts may be used to attached the gear rack 34 to the center pole 32.

Movably attached to the inner pole rail 32 and attached gear rack 34 is a movable gear box 36 that is drivable along the length of the lifting assembly 30 using an external drive source, such as a portable drill 100 or the like. Preferably, the lifting assembly 30 further comprises an outer pole slide 38 attached to the movable gear box 36 on the opposite side of the inner pole rail 32.

A pinion 42, located in the movable gear box 36, is mounted on a shaft 44 fixed in bushings (not shown) attached to the movable gear box 36. Teeth 48 of pinion 42 mesh with the teeth 35 of the attached gear rack 34. A drive shaft 50 is attached to a worm gear 52 and is mounted in bearings (not shown) fixed respectively in movable gear box 36. Rotation of the drive shaft 50 causes worm gear 52 to drive pinion 42 along the gear rack 34.

[In the present invention it is critical that the gear box 36 uses a rack and pinion system in order to prevent unwanted back-drive of the gear box 36 caused by gravity acting on the load.] Because there is no unwanted back-drive, the system of the present invention does not require a manual brake or electromagnetic brake in order to keep the load in place once lifted.

In a preferred embodiment, the present invention does not include a drive motor attached to the hand truck 1, as is commonly found in the prior art. The preferred embodiment of the present invention utilizes an external drive motor that is supplied by the user, such as a cordless power drill 100 or the like. A rotating throttle handle *102* controls the portable electric drill trigger by a throttle control cable *104* affixed to portable drill energizing forward or reverse motion to worm gear box module (not shown).

Removable lifting platforms 150 are designed to be removably attached to lift brackets 120 that are attached to the gear box 36. The lift bracket has a receiving plate 122. The receiving plate 122 preferably has at least one, more preferably at least two and most preferably at least four slots 124 to receive a like number of keys 152 from a lifting platform 150.

In a preferred embodiment, the lifting platform 150 comprises a platform plate 151 having the at least one, more preferably at least two and most preferably at least four keys 152 which simple slide into the receiving plate 122 attached to the gear box 36.

In order to keep the lifting platform 150 in place once the keys 152 are inserted into the receiving plate slots 124, a locking mechanism 126, such as a plunger spring loaded slide, passes through both the receiving plate 122 and at least one pin receiving aperture 154 in the platform plate 151 and locks the two together.

In a preferred embodiment, there are straps 160 used to hold lifted objects securely in place. In a preferred embodiment, two ratchet straps 161 are attached to the left side of the hand truck 1 with D-rings 162 for the hooks of the straps 161 to engage to the right side of the hand truck 1.

In a preferred embodiment, there is a strap lock 170 that pivotally locks and unlocks the straps 160. Preferably, located at one end of the strap axis is a toothed/ratchet gear 172. A tang 174 is pivotally attached to an end of the lift bracket 120 near the toothed gear 172 and is rotatably engagable/unengagable with the toothed gear 172. When engaged, the tang 174 locks the toothed gear 172, and consequently the strap 162, into place. When the tang 174 is disengaged from the toothed gear 172, then the strap 162 is free to be wound or unwound.

In a preferred embodiment, there may be upper and lower half moon glide brackets 126 attached to the receiving plate 122. The glide brackets 126 provide upper and lower support to the receiving plate 122 as the gear box 36 is traveling up and down the rail 32.

Located on the back side of the lifting brackets 120 are at least one glide 128 affixed to each outer corner of the bottom of the lifting brackets 120. These glides 128 allow the lifting brackets 120 to remain stable and glide with ease up and down the front of the dolly frame 10. In an alternate embodiment, the glides 128 may be made to rotate by means of a sleeve or a bearing.

In a preferred embodiment, a cordless drill chuck 51 simply slides onto the gear box drive shaft 50. The drill chuck 51 is typically tightened by hand, however square nut, hex head, or keyed head could be attached to the distal end of the drive shaft 50. This would allow the drill to be fastened to the drill with a socket attachment held in the drill chuck 51.

In order to comfortably steer the hand truck 1 according to the present invention, located just above a mid-point in the long sides 14 of the frame 10 are at least one, preferably two handles 60. Preferably, these are adjustably attached to the long sides 14 such that they can be easily placed and locked into place at a comfortable location for the different users.

There are various lifting platforms 150 that may be used with the hand truck 1 of the present invention. First, all of the various embodiments of lifting platforms 150 that are use with the present invention have a platform plate 151 with at least one, more preferably at least two and most preferably at least four keys 152 and at least one pin receiving aperture 154. In a first embodiment of the lifting platform 150, attached at a bottom edge of the platform plate 151 is a lift platform 155. In a second embodiment of the lifting platform 150, attached at a top end and a bottom end of the platform plate 151 is a pair of lift bumpers 156. In a third embodiment of the lifting platform 150, attached at a bottom edge of the platform plate 151 is a pair of lift cradles 157.

In a most preferred embodiment, the hand truck 1 further includes a wheeled kick-out 180. Preferably the kick-out 180 is pivotally attached to about a mid-point of the long sides 14 of the frame 10. More preferably, the kick-out 180 also features a spring biased locking mechanism 190 for locking the kick-out 180 to the axel rod 20 when not in use.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A hand truck for moving heavy or bulky objects comprising:

a frame having two short sides and two long sides;

a wheel and axle assembly attached to the frame;

a lifting assembly located at an intermediate position between the two long sides and extending between the two short sides; said lifting assembly comprising[;]*:* a frame center pole rail having a gear rack attached thereto;

a gear box movably attached to the frame center pole rail, said gear box including:

a toothed pinion, located in the movable gear box, mounted on a shaft in the gear box and meshing with the gear rack of the frame center pole rail*;* a worm gear that meshes with the toothed pinion, the worm gear including a drive shaft, wherein rotation of the drive shaft causes the worm gear to drive the pinion along the gear rack;

a lift bracket comprising a receiving plate with at least one slot; and at least one removable lift platform comprising a platform plate with at least one key that [are] *is* securely receivable into the at least one slot of the lift bracket receiving plate, wherein the removable lift platform further comprises a pair of lift members, with one lift member attached at a top end of the platform plate and the other lift member attached at a bottom end of the platform plate; and an aperture located in the platform plate and a locking mechanism located on the lift bracket receiving plate and receivable by the aperture located in the platform plate*;*

*wherein rotation of the drive shaft moves the gear box along the frame center pole rail.*

2. The hand truck according to claim 1 wherein the gearbox is drivable using a power supply supplied by a user.

3. The hand truck according to claim 1 wherein the pair of lift members includes a pair of lift bumpers.

4. The hand truck according to claim 1 wherein the pair of lift members includes a pair of lift cradles.

5. The hand truck according to claim 4 further comprising:

a second removable lift platform comprising a platform plate with at least one key that are securely receivable into the at least one slot of the lift bracket receiving plate, wherein the removable lift platform further comprises a pair of lift bumpers, with one lift bumper attached at a top end of the platform plate and the other lift bumper attached at a bottom end of the platform plate; whereby the hand truck can change between a pair of bumpers and a pair of cradles.

6. A hand truck for moving heavy or bulky objects comprising:

a frame having two short sides and two long sides;

a wheel and axle assembly attached to the frame;

a lifting assembly located at an intermediate position between the two long sides and extending between the two short sides; said lifting assembly comprising;

a frame pole rail having a gear rack attached thereto, a gear box movably attached to the frame pole rail, said gear box including:

a toothed pinion, located in the movable gear box, mounted on a shaft in the gear box and meshing with the gear rack of the frame pole rail a worm gear that meshes with the toothed pinion, said worm gear including a drive shaft, wherein rotation of the drive shaft causes the worm gear to drive the pinion along the gear rack;

a lift bracket comprising a receiving plate with at least one slot and at least one aperture; and at least one removable lift platform comprising a platform plate with at least one key that are securely receivable into the at least one slot of the lift bracket receiving plate and a locking mechanism receivable by the aperture located in the platform plate; wherein the platform plate further includes a pair of lift bumpers attached at a top end and a bottom end of the platform plate;

wherein the gearbox is drivable using a power supply supplied by a user.

7. A hand truck for moving heavy or bulky objects comprising:

a frame having two short sides and two long sides;

a wheel and axle assembly attached to the frame;

a lifting assembly located at an intermediate position between the two long sides and extending between the two short sides; said lifting assembly comprising;

a frame center pole rail having a gear rack attached thereto, a gear box movably attached to the frame center pole rail, said gear box including:

a toothed pinion, located in the movable gear box, mounted on a shaft in the gear box and meshing with the gear rack of the frame pole rail, a worm gear that meshes with the toothed pinion, said worm gear including a drive shaft, wherein rotation of the drive shaft causes the worm gear to drive the pinion along the gear rack;

a lift bracket comprising a receiving plate with at least one slot and at least one aperture; and at least one removable lift platform comprising a platform plate with at least one key that are securely receivable into the at least one slot of the lift bracket receiving plate and a locking mechanism receivable by the aperture located in the platform plate, wherein the removable lift platform further includes a pair of lift cradles attached at a top end and a bottom end of a platform plate;

wherein the gearbox is drivable using a power supply supplied by a user.

*8. A hand truck, comprising:*

*a frame having a first end and a second end;*

*a wheel and axle assembly attached to the first end of the frame;*

*a gear rack supported by the frame and extending between the first and second ends of the frame, the gear rack including a plurality of gear teeth spaced along a length of the gear rack;*

*a gear box movably attached to the gear rack, said gear box including a worm gear mechanically associated with the gear teeth of the gear rack so that rotation of the worm gear relative to the gear teeth causes the gear box to move along a length of the gear rack;*

*an attachment coupled to the worm gear and adapted to receive a portable, removably attachable motor to rotate the worm gear; and*

*a lifting platform coupled to the gear box and moveable along the length of the gear rack with the gear box;*

*wherein the hand truck does not include a drive motor attached to it; and*

*wherein the worm gear is positioned on a first side of the gear rack and the lifting platform is positioned on a second side of the gear rack.*

*9. The hand truck of claim 8, and further comprising a drive shaft, wherein said portable removably attachable motor is a power drill and said drive shaft is adapted to receive a drill chuck to power said lifting assembly to move said lifting platform.*

*10. The hand truck of claim 9, wherein the power drill is a cordless drill.*

*11. The hand truck of claim 9, wherein said drive shaft is arranged to rotate the worm gear to lift said lifting assembly.*

*12. A system including the hand truck of claim 8, wherein said lifting platform is a first lifting platform having a horizontal platform plate and the system further comprising a second lifting platform attachable in place of said first lifting platform, said second lifting platform having at least one cradle adapted for receiving a cylindrical object in said cradle.*

*13. A hand truck, comprising:*

*a frame having a first end and a second end;*

*a wheel and axle assembly attached to the first end of the frame;*

*a lifting platform moveable along a length of the frame; and*

*a lifting assembly arranged to move said lifting platform along the frame;*

*wherein the hand truck does not include a drive motor attached to it;*

*wherein the lifting assembly includes an attachment;*

*wherein said attachment is adapted to receive a portable removably attachable motor attached thereto to power said lifting assembly to move said lifting platform; and*

*wherein a rotatable throttle control handle is attached to the frame and controls the portable removably attachable motor by a throttle control cable affixed to the portable removably attachable motor.*

*14. A hand truck system, comprising:*

*a hand truck having:*

*a frame having a first end and a second end;*

*a wheel and axle assembly attached to the first end of the frame;*

*a lift bracket moveable along a length of the frame;*

*a lifting assembly arranged to move the lift bracket along the frame; and*

*a first lifting platform attachable to the lift bracket and having a horizontal platform plate; and*

*a second lifting platform attachable to the lift bracket in place of said first lifting platform, said second lifting platform having at least one cradle adapted for receiving a cylindrical object in said cradle;*

*wherein the lifting assembly includes a gear rack and a gear box;*

*wherein said gear rack extends between the first and second ends of the frame;*

*wherein rotation of the worm gear around an axis of rotation causes the gear box to move along a length of the gear rack;*

*wherein the first lifting platform is coupled to the gear box and moveable along the length of the gear rack with the gear box; and*

*wherein the gear box is positioned on a first side of the gear rack and the first lifting platform is positioned on a second side of the gear rack.*

*15. The hand truck system of claim 14, and further comprising a strap to securely hold objects in place on said hand truck.*

*16. The hand truck system of claim 14, wherein the cylindrical object is a water heater.*

*17. The hand truck system of claim 14, wherein the first and second lifting platforms each have a projection arranged to be received within a slot of the lift bracket.*

* * * * *